United States Patent Office 3,480,601
Patented Nov. 25, 1969

3,480,601
POLYMER COMPOUNDS WITH 2-(1-AZIRIDINYL) ALKYL ACRYLATES AND METHACRYLATES
Theodore L. Ashby and Donald B. Parrish, Lake Jackson, Tex., assignors to The Dow Chemical Company, Midland, Mich., a corporation of Delaware
No Drawing. Continuation-in-part of application Ser. No. 468,576, June 30, 1965. This application Oct. 30, 1967, Ser. No. 679,232
Int. Cl. C08f *15/00*
U.S. Cl. 260—86.1
11 Claims

ABSTRACT OF THE DISCLOSURE

Copolymers useful as protective coatings, sizes for paper and textiles, and the like are prepared by copolymerizing 2-(1-aziridinyl) alkyl acrylates or methacrylates.

---

This is a continuation-in-part of our copending application Ser. No. 468,576 filed on June 30, 1965 and now abandoned.

This invention relates to new compositions of matter containing 2-(1-aziridinyl) alkyl acrylates and methacrylates. More particularly it relates to polymer compositions comprising 2-(1-aziridinyl) alkyl acrylates or methacrylates and other ethylenically unsaturated organic compounds copolymerizable therewith and to a method of making same.

The present invention is accomplished in a polymeric composition comprising (1) from about ¼ percent to about 50 percent by weight based on the weight of the polymer of an acrylic ester selected from the group consisting of a 2-(1-aziridinyl) alkyl acrylate and a 2-(1-aziridinyl) alkyl methacrylate, and (2) from about 99¾ percent to about 50 percent by weight based on the weight of the polymer of at least one other ethylenically unsaturated comonomer copolymerizable therewith.

The 2-(1-aziridinyl) alkyl acrylates and 2-(1-aziridinyl) alkyl methacrylates employed in the present invention may be represented by the formula

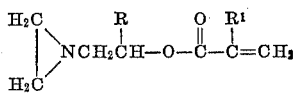

wherein R is hydrogen, methyl or ethyl and $R^1$ is hydrogen or methyl.

A compound of the above formula is polymerized with one or more ethylenically unsaturated comonomers usually at elevated temperatures in the presence of a free radical catalyst. Ethylenically unsaturated comonomers copolymerizable with said aziridinyl acrylates or methacrylates include vinyl aromatic monomers; esters of $\alpha,\beta$-unsaturated acids and in particular esters of acrylic and methacrylic acid; acrylamide or methacrylamide; acrylonitrile; dienes; vinyl pyrrolidone and N-vinyl morpholine, and the like.

Suitable aromatic monomers include styrene, vinyl toluene, $\alpha$-methyl styrene, the various halogenated styrenes such as p-chlorostyrene or 2,5-dibromostyrene, alkylated styrenes such as t-butyl styrene, vinyl naphthalene, 1,1-diphenylethylene and the like. Suitable esters include those having the formula

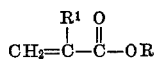

wherein R is a monovalent hydrocarbon radical containing from 1 to about 12 carbon atoms and $R^1$ is hydrogen of methyl. Suitable dienes include butadiene, isoprene, 2-halo-1,3-butadiene wherein halo is bromine or chlorine.

Copolymerizability of a monomer is readily determined by well known experimental methods or techniques. Monomers having a group which is reactive with the aziridinyl group during polymerization, such as acrylic acid or methacrylic acid, are included among those monomers not copolymerizable with said aziridinyl alkyl acrylates or methacrylates.

The polymers of the present invention are accomplished by reacting together in an inert liquid hydrocarbon solvent, (1) a 2-(1-aziridinyl) alkyl acrylate or a 2-(1-aziridinyl) alkyl methacrylate and (2) at least one other ethylenically unsaturated comonomer in the presence of a free radical catalyst.

Elevated tempeartures are employed during the course of the reaction in order to decrease the reaction time. Temperatures of from about 40° C. to about 150° C. and preferably from about 60° C. to about 110° C. are employed during the reaction.

Catalysts employed in the invention are free radical catalysts. The particular free radical catalyst employed is not critical and those known to the art are acceptable. Examples of such catalysts include peroxy compounds such as lauroyl peroxide, benzoyl peroxides; azo compounds such as azobisisobutyronitrile and per salt compounds such as tributyl perbenzoate. It is to be understood that radiation from a radio active source, such as a cobalt-60 source may also be employed.

The polymerization reaction is preferably carried out in an inert liquid organic solvent. The amount of solvent is not critical to the reaction but a large excess is not desirable. Examples of inert solvents which may be employed in the reaction include toluene, xylene, methyl ethyl ketone, dimethyl formamide and the like.

The polymerization may be carried out by any of the known methods in the art such as solution polymerization and bulk polymerization. In bulk polymerization, the reactants are subjected to polymerizable conditions without the presence of a solvent. The preferred method is to employ solution polymerization since the monomers are dissolved in a suitable solvent and in this particular type of polymerization, the upper temperature limit of the system depends upon the boiling point of the solvent and/or monomers.

It is to be understood that the polymerization reaction is not limited to one of the aziridinyl compounds and one of the copolymerizable monomers but that two or more of the aziridinyl compounds may be polymerized with one or more of the hereinbefore mentioned copolymerizable monomers. It is preferred, however, that either a 2-(1-aziridinyl) alkyl acrylate or a 2-(1-aziridinyl) alkyl methacrylate be polymerized with one or two of the copolymerizable monomers to produce copolymers or terpolymers of the invention.

In the polymerization reaction, from about ¼ percent to about 50 percent by weight of the aziridinyl compound is polymerized with from about 99¾ percent to about 50 percent by weight of the copolymerizable monomer at elevated temperatures, the percent by weight being based on the total weight of the monomer mixture.

The polymers of the present invention may be used as sizing for paper and textiles, protective coatings, encapsulating, moldings, and the like. The polymers, even those polymers containing low levels of aziridinyl ester, show greatly improved adhesion to a variety of substrata.

The following examples are illustrative of the invention and are not intended to limit the scope thereof.

Example 1.—10 percent aziridine compound, 90 percent styrene

Into a reaction vessel equipped with means for stirring, temperature control, refluxing, nitrogen purging, and reactant addition were placed 2,000 g. of toluene. The vessel was purged with nitrogen gas. The temperature was raised to 110° C. and a monomers-catalyst mixture consisting of 1,800 g. of styrene, 200 g. of 2-(1-aziridinyl) ethyl methacrylate and 20 g. of di-t-butyl peroxide was added dropwise over a 135 minute period. During the addition, the temperature was maintained at 110° C. and upon completion of the addition of the monomers-catalyst mixture, the reaction mixture was digested for about 28 hours while maintaining the same temperature. The resulting product was a clear, colorless, viscous liquid observed to have the following:

| | |
|---|---|
| Solids _____percent__ | 52.3 |
| Conversion based on V.P.C.[1] _____do___ | 99 |
| Viscosity, centistokes (cs.) _____ | 1.02 |
| No. avg. mol. wt. _____ | 40,000 |

[1] Vapor phase chromatography

In this example and the following 5 examples, the viscosity was determined as a 1 percent solution of the reaction product in toluene at 100° F. in a conventional Ostwald Viscometer.

Example 2.—15 percent aziridine compound, 85 percent styrene

Into a reaction vessel as described in Example 1 were placed 2,000 g. of toluene and the temperature raised to 110° C. While maintaining this temperature, a monomers-catalyst mixture was added dropwise over a 4½ hour period. This mixture consisted of 1,700 g. of styrene, 300 g. of 2-(1-aziridinyl) ethyl methacrylate and 20 g. of di-t-butyl peroxide. During the addition, the temperature was maintained at 110° C. and upon completing the addition, the reaction mixture was digested for about 31½ hours at 110° C. The resulting product was a clear, pale yellow viscous liquid observed to have the following:

| | |
|---|---|
| Solids _____percent__ | 51.8 |
| Conversion _____do___ | 99 |
| Viscosity (cs.) _____ | 0.82 |
| No. avg. mol. wt. _____ | 30,500 |
| Gardner color _____ | 16 |

Example 3.—20 percent aziridine compound, 80 percent styrene

Into a reaction vessel as described in Example 1 were placed 2,000 g. of toluene and the temperature raised to 110° C. While maintaining this temperature, a monomers-catalyst mixture was added dropwise over a 79 minute period. The mixture consisted of 1,600 g. of styrene, 400 g. of 2-(1-aziridinyl) ethyl methacrylate, and 20 g. of di-t-butyl peroxide. During the addition of the above mixture, the temperature was maintained at 110° C. and upon completing the addition, the reaction mixture was digested for about 45 hours at 110° C. The resulting product was a colorless viscous liquid observed to have the following:

| | |
|---|---|
| Solids _____percent | 50.8 |
| Conversion _____do___ | 99 |
| Viscosity, (cs.) _____ | 0.89 |
| No. avg. mol. wt. _____ | 38,000 |
| Gardner color _____ | 1 |

Example 4.—25 percent aziridine compound, 75 percent styrene

Into a reaction vessel as described in Example 1 were placed 2,000 g. of toluene and the temperature raised to 110° C. While maintaining this temperature, a monomers-catalyst mixture was added dropwise over about a 5½ hour period. The mixture consisted of 1,500 g. of styrene, 500 g. of 2-(1-aziridinyl) ethyl methacrylate and 20 g. of di-t-butyl peroxide. During the addition of the above mixture the temperature was maintained at 110° C. and upon completing the addition, the reaction mixture was digested for 1,526 minutes at 110° C. The resulting product was a clear yellow viscous liquid observed to have the following:

| | |
|---|---|
| Solids _____percent__ | 51.1 |
| Conversion _____do____ | 98 |
| Viscosity (cs.) _____ | 0.91 |
| No. avg. mol. wt. _____ | 40,000 |
| Gardner color _____ | 1 |

Example 5.—20 percent aziridine compound, 80 percent cyclohexyl acrylate

Into a reaction vessel as described in Example 1 were placed 1,000 g. of toluene and the temperature raised to 110° C. While maintaining this temperature, a monomers-catalyst mixture was added dropwise over about a 2 hour period. The mixture consisted of 800 g. of cyclohexyl acrylate, 200 g. of 2-(1-aziridinyl) ethyl methacrylate, and 10 g. of di-t-butyl peroxide. During the addition of the above mixture, the temperature was maintained at 110° C. and upon completing the addition, the reaction mixture was digested for about 25½ hours at 100° C. The resulting product was a yellow, clear, liquid less viscous than the previous products and observed to have the following:

| | |
|---|---|
| Solids _____percent__ | 50.2 |
| Conversion _____do___ | 99 |
| Viscosity (cs.) _____ | 0.83 |
| No. avg. mol. wt. _____ | 13,500 |
| Gardner color _____ | 1 |

Example 6.—20 percent aziridine compound, 80 percent methyl methacrylate

Into a reaction vessel as described in Example 1 were placed 1,976 g. of toluene and the temperature raised to 110° C. While maintaining this temperature, a monomers-catalyst mixture was added dropwise over about a 2½ hour period. The mixture consisted of 790 g. of methyl methacrylate, 198 g. of 2-(1-aziridinyl) ethyl methacrylate, and 9.9 g. of di-t-butyl peroxide. Upon completion of the addition of the monomers-catalyst mixture, the temperature was lowered to and maintained at a temperature of 99° C. for about 51 hours. The resulting product was a clear, colorless, viscous liquid observed to have the following:

| | |
|---|---|
| Solids _____percent__ | 35.1 |
| Conversion _____do____ | 99 |
| Viscosity (cs.) _____ | 0.91 |
| No. avg. mol. wt. _____ | 40,000 |
| Gardner color _____ | 1 |

Example 7.—20 percent aziridine compound, 40 percent methyl methacrylate, 40 percent butyl acrylate Into a reaction vessel as described in Example 1 were placed 2,000 g. of xylene and the temperature raised to 98° C. While maintaining this temperature, a monomers-catalyst mixture was added dropwise over a 4 hour period. The mixture consisted of 800 g. of methyl methacrylate, 800 g. of butyl acrylate, 400 g. of 2-(1-aziridinyl) ethyl methacrylate and 20 g. of di-t-butyl perbenzoate. Upon completion of the above monomers-catalyst addition, the reaction mixture was digested for 25 hours at 98° C. The resulting product was a clear, pale yellow, viscous liquid observed to have the following:

| | |
|---|---|
| Solids _____percent__ | 50.4 |
| Conversion _____do____ | 99 |
| Viscosity (cs.) _____ | 0.85 |
| No. avg. mol. wt. _____ | 8,700 |
| Gardner color _____ | 1 |

The viscosity was determined as a 1 percent solution of the reaction product in xylene at 100° F. in a conventional Ostwald Viscometer.

A portion of the polymer product of each of

Examples 1 through 7 was tested for stability. The polymer was placed in a closed container and periodically a small portion of the polymer was titrated to determine the concentration of aziridine remaining in the product. A pyridine-HCl titration method was employed. The tests showed that all the polymers had a shelf life or stability of greater than eight months.

Example 8

A citrate bottle was loaded with 50 g. of toluene, 10 g. of butyl acrylate, 70 g. of methyl methacrylate, 20 g. of 2-(1-aziridinyl) ethyl methacrylate and 1 g. of azobisisobutyronitrile. The bottle was capped with a conventional crown capping machine and placed into an oil bath at 60° C. for 24 hours. The resulting product was a clear viscous liquid having 64.9 percent solids and 98 percent conversion to the resulting polymer.

Example 9

Into a reaction vessel, equipped with means for stirring, temperature control, refluxing and monomer addition, were placed 150 g. of toluene, 105 g. of styrene, 15 g. of butyl acrylate, 30 g. of 2-(1-aziridinyl) ethyl methacrylate and 0.75 g. of azobisisobutyronitrile. The temperature on this charge was maintained at about 80° C. for 24 hours. The resulting product was a clear viscous liquid having 19 percent solids and 39 percent conversion to the resulting polymer.

Example 10

The procedure of Example 9 was substantially repeated except that the following reactants were substituted:

|  | G. |
|---|---|
| Xylene | 200 |
| Butyl acrylate | 20 |
| Methyl methacrylate | 140 |
| 2-(1-aziridinyl) ethyl methacrylate | 40 |
| Azobisisobutyronitrile | 2 |

The reaction was carried out at 70° C. for a period of 24 hours. The reaction product was a clear viscous liquid having 50 percent solids and 100 percent conversion to the resulting polymer.

Example 11

The procedure of Example 8 was substantially repeated except that the following reactants were substituted:

|  | G. |
|---|---|
| Xylene | 100 |
| 2-(1-aziridinyl)ethyl methacrylate | 20 |
| Azobisisobutyronitrile | 1 |
| Styrene | 80 |

The reaction was carried out at 70° C. for a period of 24 hours. The reaction product was a clear viscous liquid having 35 percent solids and 69 percent conversion to the resulting polymer.

Example 12

The procedure of Example 9 was substantially repeated except that the following reactants were substituted:

|  | G. |
|---|---|
| Pentoxone [1] | 200 |
| Styrene | 160 |
| 2-(1-aziridinyl)ethyl methacrylate | 40 |
| Di-t-butyl peroxide | 2 |

[1] Pentoxone is

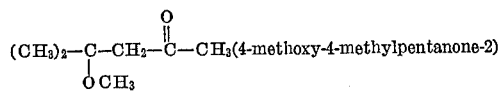

The reaction was carried out at 110° C. for a period of 24 hours. The reaction product was a clear viscous liquid having 49 percent solids and 97 percent conversion to the resulting polymer.

Example 13

The procedure of Example 9 was substantially repeated except that the following reactants were substituted:

|  | G. |
|---|---|
| Xylene | 200 |
| Styrene | 160 |
| 2-(1-aziridinyl)ethyl methacrylate | 40 |
| Benzoyl peroxide | 1.5 |
| Di-t-butyl peroxide | 2 |

The reaction was carried out at a temperature of 120° C. for a period of 16 hours. The reaction product was a clear viscous liquid having 46 percent solids and 95.8 percent conversion to the resulting polymer.

Example 14

The procedure of Example 9 was substantially repeated except that the following reactants were substituted:

|  | G. |
|---|---|
| Propylene glycol methylether | 400 |
| Styrene | 340 |
| 2-(1-aziridinyl)ethyl methacrylate | 60 |
| Benzoyl peroxide | 6 |
| Di-t-butyl peroxide | 2 |

Tre reaction was carried out at a temperature of 60° C. for a period of 16 hours. The reaction product was a clear viscous liquid having 37.7 percent solids and a conversion of 75 percent to the resulting polymer.

Example 15

The procedure of Example 9 was substantially repeated except that the following reactants were substituted:

|  | G. |
|---|---|
| Xylene | 375 |
| Styrene | 262.5 |
| 2-(1-aziridinyl)ethyl methacrylate | 113.5 |
| Azobisisobutyronitrile | 3.8 |

The reaction was carried out at a temperature of 110° C. for a period of 16 hours. The reaction product was a clear viscous liquid having 39 percent solids.

Example 16

The procedure of Example 8 was substantially repeated except that the following reactants were substituted:

|  | G. |
|---|---|
| Isopropanol | 79 |
| Isobutyl acrylate | 25 |
| 2-(1-aziridinyl)ethyl methacrylate | 25 |
| Azobisisobutyronitrile | 0.5 |

The reaction was carried out at a temperature of 60° C. for a period of 17 hours. The reaction product was a clear viscous liquid having 39 percent solids.

Example 17

In a test exemplary of the utility of the invention, the product of Example 16 was diluted to a 5 percent solution in isopropanol and used to treat cloth and paper. Cotton cloth and standard white blotter paper were soaked in the solution and oven dried. Upon evaporation of the isopropanol, both the cloth and paper became somewhat stiff and would hold creases. The polymer, being soluble in acetone, could not be washed out of the cloth or paper with acetone. This indicated that a reaction had occurred between the polymer and the cellulose fibers.

Example 18

In a manner similar to the preceding examples the following monomers were polymerized:

|  | Gm. |
|---|---|
| Methyl methacrylate | 195 |
| Butyl acrylate | 105 |

3 gm. 2-(1-aziridinyl)ethyl methacrylate using 3 gms. of 2,2'-azobisisobutyronitrile as the catalyst and ethyl acetate (150 gm.) and benzene (150 gm.) as the solvent. The polymerization was carried out at a temperature of 75° C. during the addition of monomers and raised to 80° C. thereafter. The polymer solution was clear with a slight yellow tint, had a solids content of 51.8% and a Gardner viscosity of Y/Z.

Example 19

Likewise, a copolymer was prepared from 60 parts of 2-(1-aziridinyl) ethyl methacrylate and 240 parts of acrylonitrile in 700 parts of dimethyl formamide as the solvent using 3.5 parts of catalyst. Polymerization was carried out for 22 hours.

The final polymer solution contained 28.3 weight percent non-volatile solids, had a Gardner color of 17.5, had a Brookfield viscosity of 54 cps. at 25° C. and a predominant molecular weight of about 30,000 as determined by gel permeation chromatography.

Example 20

Similar to Example 19, a copolymer was prepared by replacing the acrylonitrile with o-chlorostyrene and the formamide solvent with toluene. The resultant polymer solution had a Gardner color of less than 1 and a Brookfield viscosity of 12 cps. at 25° C. The predominant molecular weight of the copolymer was about 20,000.

What is claimed is:

1. A free radical polymerized copolymer comprising (a) from about ¼ to about 50 percent by weight of a 2-(1-aziridinyl)alkyl acrylate or methacrylate monomer having the formula:

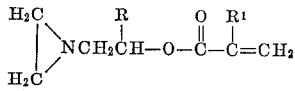

wherein R is hydrogen, methyl or ethyl and $R^1$ is hydrogen or methyl and (b) from about 99¾ to about 50 percent by weight of at least one other ethylenically unsaturated monomer copolymerizable therewith selected from the group consisting of vinyl aromatic monomers, esters of α,β-unsaturated acids, acrylamide, methacrylamide, acrylonitrile, conjugated aliphatic dienes, vinyl pyrrolidone and N-vinyl morpholine.

2. The composition of claim 1 wherein said vinyl aromatic monomer is styrene or o-chlorostyrene.

3. The copolymer of claim 1 wherein the aziridinyl methacrylate is 2-(1-aziridinyl) ethyl methacrylate.

4. The copolymer of claim 1 wherein the copolymerizable monomer is an ester of an unsaturated acid having the formula

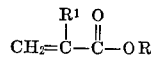

wherein $R^1$ is hydrogen or methyl and R is a monovalent hydrocarbon radical containing from 1 to about 12 carbon atoms.

5. The copolymer of claim 4 wherein said hydrocarbon radical is cyclohexyl, methyl, butyl or isobutyl.

6. A copolymer comprising essentially the composition of claim 1 dissolved in an inert organic solvent.

7. A process for producing novel copolymers which comprises polymerizing in the presence of free radicals at temperatures of about 40° C. to about 150° C. in an inert solvent (a) from about ¼ to about 50 percent by weight of a 2-(1-aziridinyl)alkyl acrylate or methacrylate monomer having the formula:

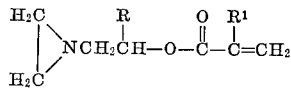

wherein R is hydrogen, methyl or ethyl and $R^1$ is hydrogen or methyl and (b) from about 99¾ to about 50 percent by weight of at least one other ethylenically unsaturated monomer copolymerizable therewith selected from the group consisting of vinyl aromatic monomers, esters of α,β-unsaturated acids, acrylamide, methacrylamide, acrylonitrile, conjugated aliphatic dienes, vinyl pyrrolidone and N-vinyl morpholine.

8. The process of claim 7 wherein the aziridinyl methacrylate is 2-(1-aziridinyl) ethyl methacrylate.

9. The process of claim 7 wherein the copolymerizable monomer is an ester of an unsaturated acid having the formula

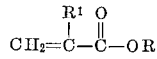

wherein $R^1$ is hydrogen or methyl and R is a monovalent hydrocarbon radical containing from 1 to about 12 carbon atoms.

10. The process of claim 9 wherein said hydrocarbon radical is cyclohexyl, methyl, butyl or isobutyl.

11. The process of claim 7 wherein said aromatic monomer is styrene or o-chlorostyrene.

References Cited

UNITED STATES PATENTS

| | | | |
|---|---|---|---|
| 2,654,737 | 10/1953 | Bestian et al. | 260—88.3 |
| 3,006,912 | 10/1961 | Vierling et al. | 260—88.3 |
| 3,017,280 | 1/1962 | Yudelson. | |
| 3,290,416 | 12/1966 | Christenson et al. | |
| 3,383,373 | 5/1968 | Waples | 260—86.7 |

HARRY WONG, Jr., Primary Examiner

U.S. Cl. X.R.

8—54.2; 117—139.5, 155; 204—159.22; 260—31.2, 32.6, 32.8, 33.4, 33.6, 80.3, 80.72, 83.5, 85.5, 87.5, 88.1